July 25, 1950 C. W. BROWN 2,516,296
SYNCHRONIZER FOR MULTIPLE SET RADAR SYSTEMS
Filed May 3, 1949
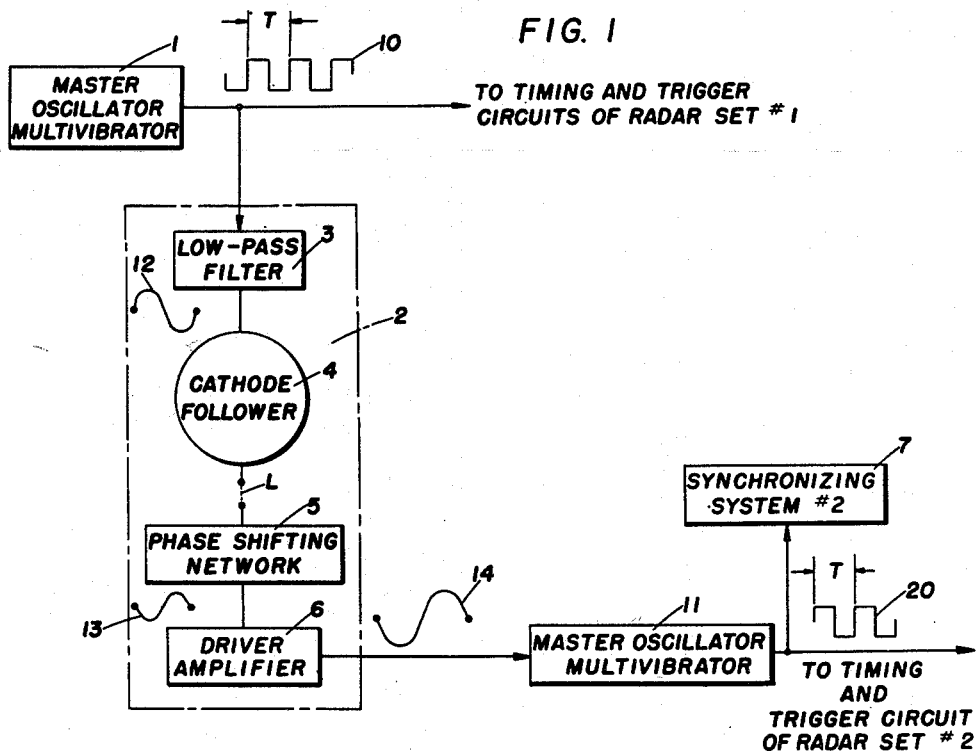
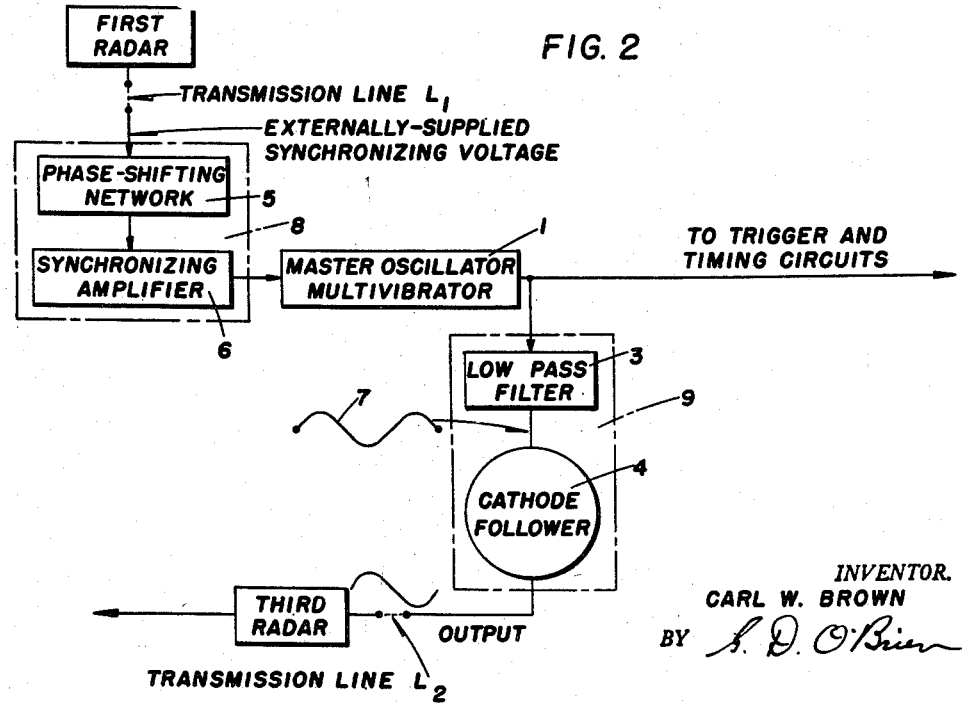
INVENTOR.
CARL W. BROWN
BY
ATTORNEY Patented July 25, 1950

2,516,296

UNITED STATES PATENT OFFICE 2,516,296

SYNCHRONIZER FOR MULTIPLE SET RADAR SYSTEMS

Carl W. Brown, Silver Spring, Md., assignor to the United States of America as represented by the Secretary of the Navy Application May 3, 1949, Serial No. 91,083

7 Claims. (Cl. 343—5)

This invention relates to a multiple set radar system. More specifically, it relates to means for synchronizing the operation of several similar radars closely adjacent one another and having the same pulse repetition frequency, and to the process employed.

In order to operate several radar equipments simultaneously at about the same frequency and in close proximity to each other (as aboard a ship), it is necessary to provide some means of synchronization of their transmitting periods so as to provoke a minimum of interference with one another.

The rate at which pulses are transmitted is commonly controlled by a master multivibrator circuit in the radar equipment. This circuit, in turn, may be synchronized by a sine wave voltage of slightly higher frequency than that of the multivibrator. Thus, the exact time of transmission can be controlled by an external master oscillator of the proper frequency. Furthermore, by means of a phase-shift circuit, a second radar transmitter having substantially the same pulse repetition frequency can also be made to transmit at a time different from that of the first transmitter, due to this phase shift. This permits the second radar system to transmit at a time such that its transmission causes a minimum of interference with the first radar system, and vice versa.

Because of the scarcity of external master oscillator units, it was customary to tolerate the interference produced by adjacent radar sets.

The present invention was designed for use in place of the external master oscillator and is to be incorporated into the circuit structure of each set of a system of standard radars. The invention is utilized to derive a synchronizing control voltage from the master oscillator multivibrator of each of the radar sets and to apply the derived control voltage to the next succeeding set, for controlling the relative time of transmission of each set in the system.

Therefore, it is an object of the present invention to provide synchronous operation of adjacent radar sets having substantially the same pulse repetition frequency.

Another object of this invention is to eliminate the need for a separate external master oscillator of a synchronously operated system of radar sets.

A further object of this invention is to provide synchronous operation of a system of standard radar sets without substantial modification of the circuit structure of the individual sets.

Other objects and many of the attendant advantages of this invention will be appreciated readily as the same becomes understood by reference to the following detailed description, when considered in connection with the accompanying drawings, wherein:

Fig. 1 shows a block diagram of the invention adapted for general use, and

Fig. 2 shows a block diagram of a modification of the invention adapted for use on a "Mark 39," fire control radar.

More specifically, Fig. 1 shows a pair of free running multivibrators 1, 11 of general construction, which constitute the master oscillators of standard radar sets. Each of multivibrators 1, 11 has a square wave voltage output 10, 20, the frequency and period of which is determined by the values of the parameters of the multivibrator circuits. The operation of the multivibrators may be further controlled by a synchronizing control voltage applied to the control grid of one of the electron tubes in the multivibrator circuit. For optimum operation the period of the synchronizing voltage should be slightly less than the period T of square waves 10, 20.

The square wave output of multivibrator 1 is fed to the trigger and timing circuits of radar set No. 1 and to the input of low pass filter 3. Low pass filter 3 is of standard construction and may comprise an RC circuit tuned to pass the fundamental frequency $$\frac{1}{T}$$

of the multivibrator. The filter 3 serves to filter out the higher harmonics present in square wave 10 and to derive a sine wave 12 of fundamental frequency $$\frac{1}{T}$$

in its output. It should be understood that the output voltage of the multivibrators may be something other than the exact square wave illustrated but this would not alter the operation of the present system so long as the fundamental frequency $$\frac{1}{T}$$

remains the same.

The output of low pass filter 3 is coupled to the input of cathode follower 4, the output of which is coupled through transmission line L to the input of phase shifting network 5. Cathode follower 4 serves to match the relatively high impedance output of filter 3 to the relatively low impedance input of transmission line L and phase shifting network 5. The transmission line L serves to interconnect the two radars whose relative operation is to be controlled and may be of varying length.

The phase shifting network 5 may comprise a transformer having a center tapped secondary connected in parallel with a series combination of a capacitor and a variable resistor, however any of the known variably controlled phase shifting networks would serve equally as well for it is not intended to restrict the circuit to any specific construction. Variable phase shifting network 5 serves to shift the phase of the derived sinusoidal wave 12 a desired number of degrees thereby to provide a means for adjustably controlling the time of firing of the master oscillator multivibrator 11 with respect to the time of firing of master oscillator multivibrator 1.

The output of phase shifting network 5 is coupled to the input of driver amplifier 6 and the output of driver amplifier 6 is coupled to the input of the synchronized multivibrator 11. The output of multivibrator 11 is connected to its respective trigger and timing circuits and to a second synchronizing circuit 7. Synchronizing circuit 7 is similar in construction to circuit 2 and therefore is not described in detail. Driver amplifier 6 serves to amplify the phase shifted sinusoidal control voltage to an amplitude sufficient to insure its control over the time of firing of the synchronized multivibrator 11.

In order to insure control over the time of firing of multivibrator 11, and thereby provide the optimum operation of the system previously mentioned, the period of the amplified synchronizing voltage 14 should be slightly less than the period of the output waveform of multivibrator 11. This relation may be achieved by adjusting the frequency of oscillation of multivibrator 11 to be slightly lower than the frequency of control wave 14. A difference in frequency of one or two cycles would suffice to insure proper control. The output of multivibrator 11 may then be fed to its respective timing and trigger circuits and through synchronizing circuit 7 to control the time of firing of the next succeeding radar set in the system.

Any desired number of radar sets may be synchronized in their operation by use of the present invention. As many as four units have been operated simultaneously without any interference difficulties and more units may be operated if a slight increase in interference is tolerated, or if the individual units are located judiciously with respect to one another.

Fig. 2 shows a modification of the present invention adapted for use on the "Mark 39" fire control radar. The modification shown in Fig. 2 does not differ essentially from that shown in Fig. 1 but has been included to show the preferred manner of constructing the present invention in two sections and is shown broadly at 8 and 9. The sections 8 and 9 are built into each individual radar set. Section 8 is connected to the input of the master oscillator multivibrator 1 and includes the phase shifting network 5 and driver amplifier 6 described with relation to Fig. 1. Section 9 is connected to the output of the master oscillator multivibrator and includes the low pass filter 3 and cathode follower 4 described with relation to Fig. 1. Each of the elements 3, 4, 5, 6, L₁ and L₂ of Fig. 2 functions in exactly the same manner as does its counterpart in Fig. 1, therefore, a discussion of the manner of operation of the embodiment of the invention shown in Fig. 1 is thought to be a sufficient disclosure of the manner of operation of Fig. 2.

The square wave output of multivibrators 1, 11 may be resolved into an integral number of sinusoidal wave shapes in accordance with the Fourier analysis of a uniformly repetitious wave. The waveform thus analyzed would contain a fundamental (lowest) frequency equal to $$\frac{1}{T}$$

and an integral number of harmonics thereof. In the present invention the higher frequency components of the square wave 10, 20 are eliminated and the fundamental derived as a sinusoidal control voltage in filter 3. The sine wave voltage thus derived is coupled by means of a proper impedance matching network 4 through transmission line L to the phase shifting circuit 5 located on the radar set whose time of transmission is to be controlled. Phase shifting network 5 shifts the phase of the sinusoidal control voltage a desired number of degrees along the time axis. The resultant phase shifted sinusoidal voltage is then amplified and applied to the control grid of the master oscillator of the controlled radar set as a synchronizing control voltage thereby to control the time of transmission of the controlled radar set relative to that of the controlling set.

Obviously many modifications and variations of the present invention are possible in the light of the above teachings. It is therefore to be understood that within the scope of the appended claims the invention may be practiced otherwise than as specifically described.

What is claimed is:

1. In combination, a plurality of standard pulse modulated radar sets, means for deriving from one of said radar sets a sinusoidal synchronizing control voltage, and means for utilizing said control voltage to control the time of transmission of another of said sets.

2. In combination, a plurality of standard pulse modulated radar sets, each having a master oscillator which controls the time of transmission of its associated set, means for deriving from the master oscillator of one of the sets a sinusoidal synchronizing control voltage, and means for utilizing said control voltage to control the time of transmission of another of said sets.

3. The combination set forth in claim 2, further characterized in that said means for utilizing the control voltage comprises a variable means for shifting the phase of the derived sinusoidal synchronizing control voltage a desired number of degrees, and means for applying the phase shifted control voltage to the input circuit of the master oscillator of the next succeeding radar set.

4. The combination set forth in claim 2 further characterized in that said means for utilizing the derived control voltage comprises a variable phase shifting means, an impedance matching means connected between said means for deriving a sinusoidal control voltage and said variable phase shifting means, and means for applying the phase shifted control voltage to the input circuit of the master oscillator of the next succeeding radar set.

5. In combination, a plurality of standard pulse modulated radar sets each having a master oscillator which controls the time of transmission of its associated set, a low pass filter circuit coupled to the output of the master oscillator of one of said radar sets, a cathode follower coupled to the output of said low pass filter, a variable phase shifting circuit coupled to the output of said cathode follower through a transmission line, and a driver amplifier coupled to the output of said variable phase shifting circuit, the output of said driver amplifier being coupled to the input of the master oscillator of the next succeeding radar set.

6. In combination, a source of rectilinear, uniformly repetitious waves, a low pass filter coupled to the output of said source of waves for deriving a sinusoidal wave therefrom, an impedance matching means coupled to the output of said low pass filter, a phase shifting network coupled to the output of said impedance matching means, and an amplifier coupled to the output of said phase shifting network.

7. In combination, a radar set having a master oscillator which controls the time of transmission of the set, a low pass filter coupled to the output of said oscillator and an impedance matching means coupled to the output of said low pass filter; an amplifier coupled to the input control circuit of said master oscillator and a phase shifting network coupled to the input of said amplifier.

CARL W. BROWN.

REFERENCES CITED

The following references are of record in the file of this patent:

UNITED STATES PATENTS

| Number | Name | Date |
|---|---|---|
| 2,407,287 | Labin | Sept. 10, 1946 |
| 2,449,443 | Bettler | Sept. 14, 1948 |